United States Patent [19]

Kessinger et al.

[11] 4,331,411
[45] May 25, 1982

[54] DOOR LOCK DRILL ASSEMBLY

[76] Inventors: Charles Kessinger, 6345 Glennis, Taylor, Mich. 48180; Russell Dolin, 190 Soughfield Rd., Ecorse, Mich. 48229

[21] Appl. No.: 151,229

[22] Filed: May 19, 1980

[51] Int. Cl.³ ............................................. B73B 47/28
[52] U.S. Cl. ..................................... 408/97; 408/108; 408/115 R
[58] Field of Search ................... 29/26 A; 408/115 R, 408/204, 79, 72, 112, 110, 113, 108, 97

[56] References Cited

U.S. PATENT DOCUMENTS

| | | | |
|---|---|---|---|
| 1,299,938 | 4/1919 | Hathawa | 408/115 |
| 1,919,900 | 7/1933 | Moller | 408/115 X |
| 2,679,174 | 5/1954 | Schlage | 408/115 X |
| 2,679,771 | 6/1954 | Schlage | 408/115 X |
| 3,048,062 | 8/1962 | Bass | 408/97 |
| 3,293,953 | 12/1966 | Hendrick | 408/112 |
| 3,327,573 | 6/1967 | Prussiano | 408/115 |
| 3,635,571 | 1/1972 | Roberts | 408/97 |
| 3,874,810 | 4/1975 | Russell | 408/110 |
| 4,036,560 | 7/1977 | Clark et al. | 408/204 |
| 4,072,441 | 2/1978 | LaPointe | 408/204 |
| 4,082,474 | 4/1978 | Stiger | 408/110 |
| 4,242,016 | 12/1980 | Faris | 408/112 X |
| 4,248,554 | 2/1981 | Boucher et al. | 408/115 R |

Primary Examiner—William R. Briggs
Attorney, Agent, or Firm—Cullen, Sloman, Cantor, Grauer, Scott & Rutherford

[57] ABSTRACT

A door lock drill assembly includes a housing with an apertured side wall and end wall, securable upon the upright edge of a door for drilling a first aperture through the door on a first axis and successively drilling a second aperture into the door edge on second axis coplanar to and at right angles to the first axis. Guides are mounted upon the side wall and end wall and extend at right angles thereto. A hole saw is reciprocally mounted upon one guide coincident with the first axis, and includes a projecting coaxial drill shaft. A drill bit is reciprocally mounted upon the other guide coincident with the second axis, and includes a projecting coaxial drill shaft. The drill shafts are adapted to be selectively and alternately power driven and fed into the door by the application thereto of a power driven tool.

11 Claims, 5 Drawing Figures

DOOR LOCK DRILL ASSEMBLY

BACKGROUND OF THE INVENTION

Heretofore, providing for cylinder locks or other locks for doors, it is necessary to carefully and correctly drill a cylindrical opening transversely through the door edge on a first axis and thereafter and successively carefully drill a further aperture into the door edge upon a second axis at right angles to the first axis and coplaner therewith, and wherein the second aperture is coincident with and registers with the first aperture in order to cooperatively receive the door lock assembly and lock cylinder, etc. Various means have been heretofore employed, essentially, a hand operated bit or bits for drilling the respective apertures. Some of the difficulties involved are making sure that the axes of the respective apertures are coincident and are at two right angles to each other. Further problems arise in drilling the door in such a way as not to splinter or otherwise damage the outer surfaces of the door style or rail, or to otherwise mar the door edges. Further problems exist in the careful locating and drilling of such apertures wherein door locks are provided for indoor and outdoor doors, and wherein the doors are of different thickness.

SUMMARY OF THE INVENTION

It is a primary feature of the present invention to provide a door lock drill assembly which may be removably affixed to a door at the proper location which mounts a pair of right angularly related alternately operable drills which are guidably supported, and wherein each drill includes a drill shaft which is adapted to be power driven and fed into the door upon first and second axes at right angles.

It is a further feature to provide a door lock drill assembly with mechanism for effectively locating and anchoring the assembly and its housing upon a door edge, and which will at the same time protect the respective surfaces of the door from marring or splintering during the drilling, and wherein the drill assembly may be adapted to doors of different thicknesses.

It is a further advantage to provide an improved drill assembly for door locks which includes guide mechanism applied thereto upon which the respective drills are guidably supported and mounted for alternate longitudinal feed movements on the respective right angularly related axes to provide a pair of apertures in the door which truly intersect, and wherein a power drive mechanism may be removably applied to both of the drills successively and alternately.

A further feature includes within the guide mechanism for supporting the respective drills for reciprocal movements alternately into the door edge and therethrough which includes stop mechanism for limiting inward and outward movement of the respective drills and for protectively enclosing the drills when in retracted positions.

These and other objects will be seen from the following specification and claims in conjunction with the appended drawings.

THE DRAWINGS

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 1:
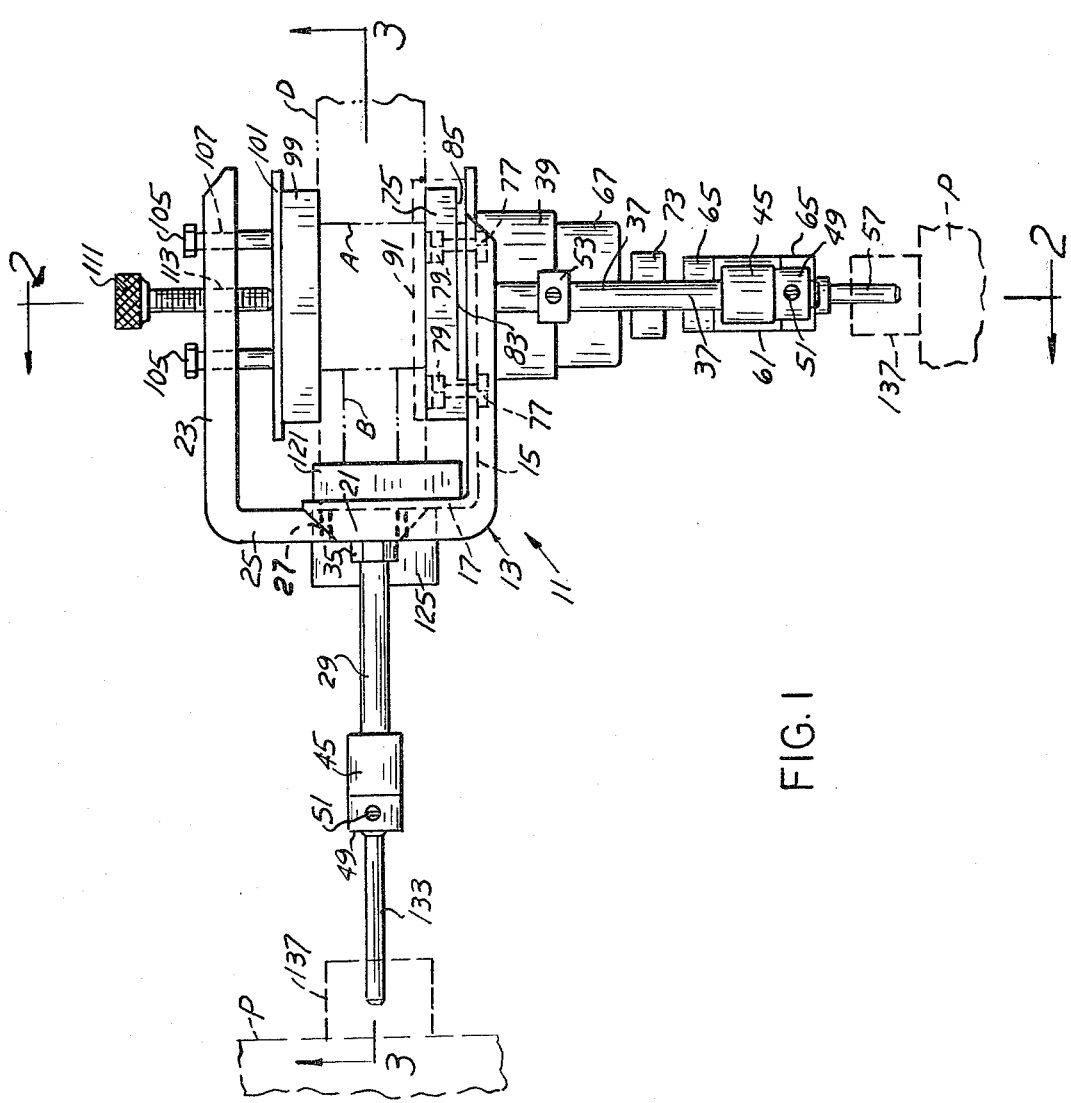
FIG. 1 is a plan view of the present door lock drill assembly as applied to a door edge fragmentarily shown in dash lines, and wherein the alternately usable power driven tool is fragmentarily shown in dash lines as applied to the outer ends of the drill shafts.

The present door lock drill assembly is generally indicated at 11, FIG. 1, which is a plan view thereof, which includes a housing 13 of U-shape in plan having an apertured side wall 15 and an apertured end wall 17. Said housing is positionably upon and securable to the upright edge of a door D shown in dash lines. Side wall 15 has an outwardly directed reinforcing top and bottom flanges 19 and connected thereto upon the end wall top and bottom end flanges 21.

The present door lock drill assembly is adapted for drilling a cylindrical first aperture A through the door on a first axis and for drilling successively a second aperture B into the door edge on a second axis coplaner to and at right angles to the first axis, such as shown in dash lines in FIG. 1.

The housing includes a means for securing the same upon the door so as to cooperatively engage opposite sides thereof and the adjacent door edge. In the illustrative embodiment, the housing includes for this purpose a pair a vertically spaced side arms 23 of L-shape which are spaced from the side wall 15 with their ends overlying and suitably secured to end wall 17.

The respective end portions of the L-shaped side arms are located upon said end wall by a plurality of outwardly projecting dowels 27 received within corresponding apertures in said arms. The arms are affixed to the end wall by fasteners.

Figure 3:
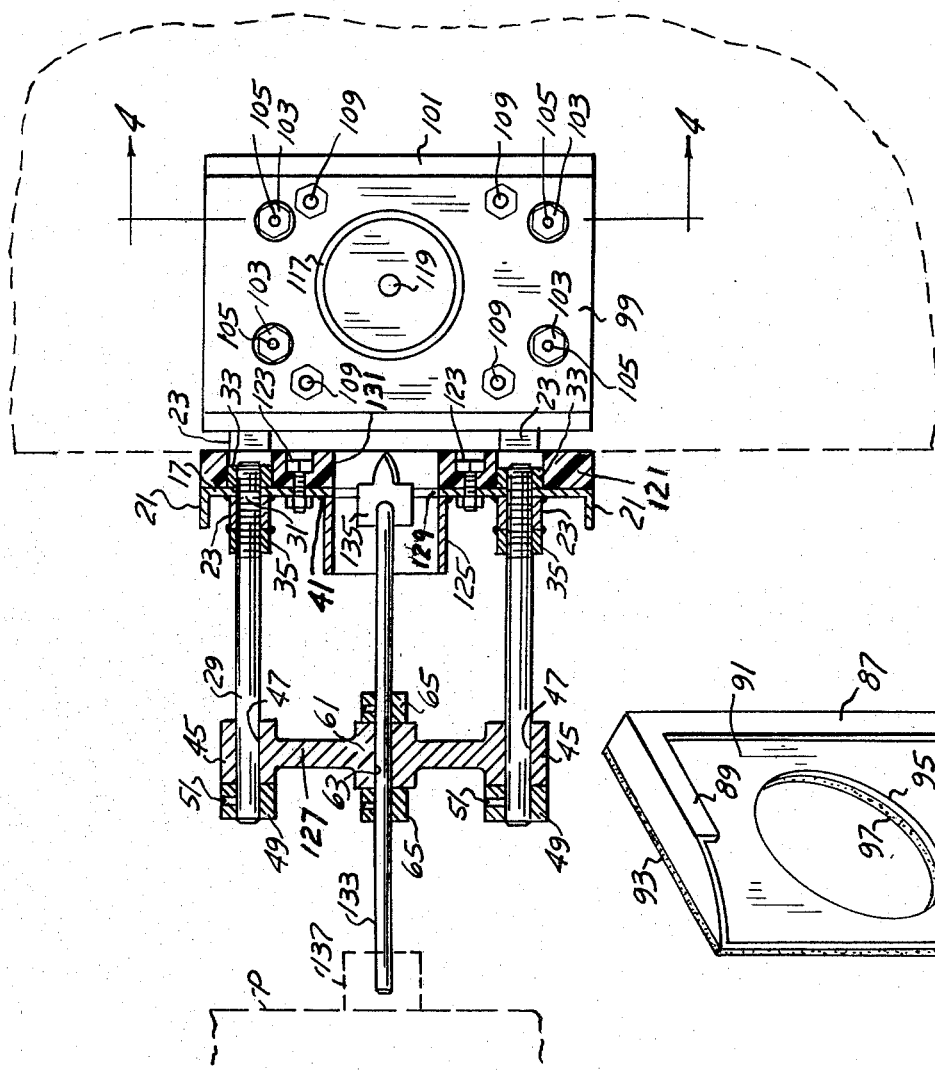
FIG. 3 is a fragmentary section taken in the direction of arrows 3—3 of FIG. 1.

These fasteners include upon said end wall and projecting outwardly thereof at right angles thereto a pair of vertically spaced guide rods 29, FIGS. 1 and 3, whose threaded ends 31 project through end portions of the side arms, through end wall 17 and are secured thereto by the nuts 33, FIG. 3. Lock nuts 35 are threaded onto guide rods 29 and are in operative securing engagement with the outer surface of the end portions of the side arms 23 with a suitable lock washer interposed.

Figure 2:
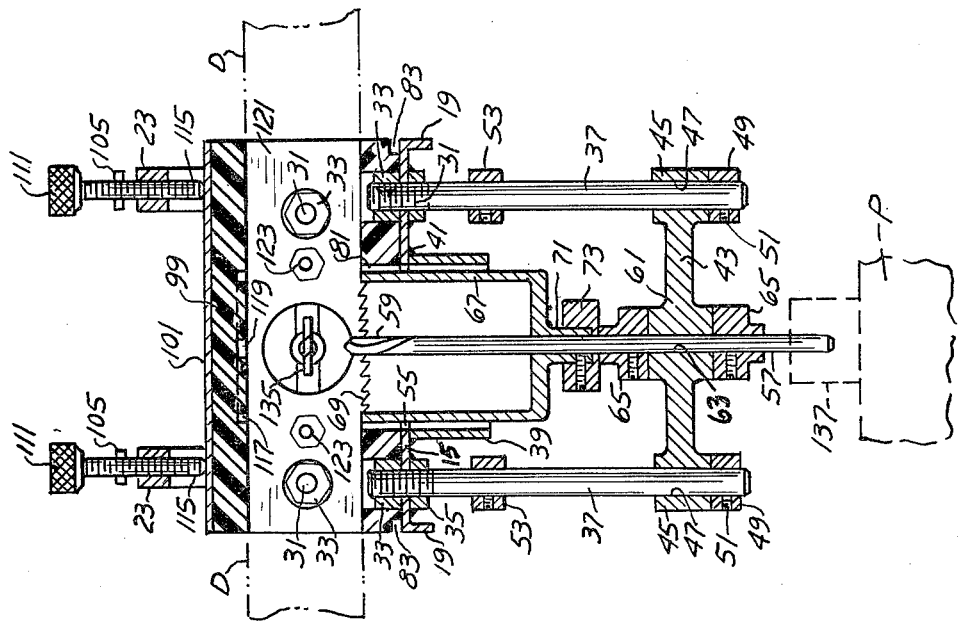
FIG. 2 is a fragmentary section taken in the direction of arrows 2—2 of FIG. 1.

The guide means for the respective drills further includes an additional pair of vertically spaced parallel guide rods 37, FIGS. 1 and 2, which are of the same construction as the guide rods 29, and whose inner threaded ends 31 are projected through apertures in the side wall 15 and receive the fasteners or nuts 33 upon the opposite side thereof. Additional lock nuts 35 are applied to threaded ends of the guide rods 37 on the exterior of the side wall 15 for effectively anchoring the guide rods so as to project outwardly of said side wall in parallel spaced relation.

The cylindrical protective sleeve 39 is mounted upon side wall 15 outwardly of its aperture 55 and is secured thereto as by the weld 41.

The guide means for the respective drills includes the upright drill guide 43 mounting end bosses 45 which are apertured at 47 to receive the guide rods 37. Stop collars 49 are secured adjacent the outer ends of rods 37 and employ a set screw 51 for limiting outward movement of the drill guide 43, such as shown in FIG. 2. Additional stop collars 53 are similarly secured to intermediate portions of the rods 37 for limiting inward projection of drill guide 43 and the connected drill or saw 69.

Elongated drill shaft 57 includes at its inner end a centering bit 59 which normally extends inwardly of the circular saw teeth 69, as in FIG. 2, and intermediate its ends it is rotatively projected through the bore 63 of hub 61 of drill guide 43. Stop collars 65 are arranged upon opposite sides of the drill guide hub 61, are suitably secured to drill shaft 57 and are rotatable therewith. By this construction, the drill shaft 57 is rotatably journaled and supported upon drill guide 43 and retained against endwise movement with respect to the boss 61 by the stop collars 65, FIG. 2.

The present hole saw has a drill tube 67 which terminates in a series of circularly arranged saw teeth 69, FIG. 2. The tube 67 terminates in the axial hub 71 which axially receives drill shaft 57 and is secured thereto as by the lock collar 73 for rotation with said drill shaft.

The above description of first guide means for the circular saw or drill 67, 69 is the same as the construction of the second guide means 29, 127, FIGS. 1 and 3, for guiding reciprocal longitudinal drilling movements of drill bit 135 shown in FIG. 3.

Upright rectangular cushion pad 75 of a non-metallic material such as plastic, and for illustration Teflon, is mounted upon the interior of side wall 15 and secured thereto by a plurality of fasteners 77 with nuts 79 nested within corresponding apertures formed within said pad, FIG. 1. Pad 75 has a central circular aperture 81 inwardly of and coaxial to side wall aperture 55 through which the drill tube 67 and saw teeth 69 may project for operative engagement with the door D and for drilling the aperture A therethrough, FIG. 1.

As shown in FIG. 2, formed within cushion pad 75 are the top and bottom adapter slots 83 and upon one side the upright side adapter slot 85, FIG. 1.

Figure 5:
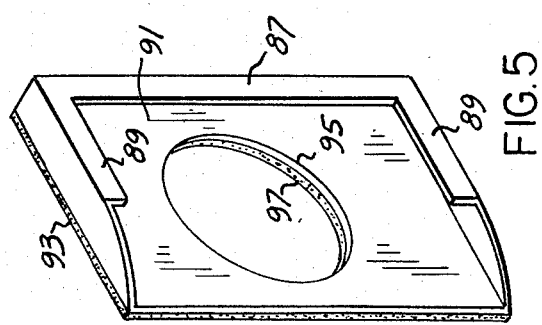
FIG. 5 is a perspective view of the adapter plate movably mountable upon the cushion pad upon the interior of the housing side wall, and shown in dash lines in FIG. 1.

The adapter plate 91, shown in FIG. 5, has spaced rearwardly thereof the opposed upright top and bottom flanges 89 and the adjacent inwardly directed side flange 87. These flanges are adapted to slidably nest and be supported within the corresponding top and bottom slots 83 and respective side adapter slot 85 within the cushion pad 75. The adapter is alternately usable when it is necessary to drill apertures through a conventional narrower inside door, which is thinner than the conventional outside door. Therefore, the adapter 91 is shown in dash lines in FIG. 1 as being removably mounted upon pad 75 upon side wall 15.

The inner surface of the adapter includes a facing layer 93 of rubber or plastic suitably adhered or otherwise secured to adapter plate 91, which has a corresponding aperture 97 in registry with circular aperture 95 within adapter plate 91.

Accordingly, when the adapter plate is in position upon pad 75, the apertures 95 and 97 are in corresponding registry with pad aperture 81 and side wall aperture 55, providing sufficient clearance for inward projection of the circular saw 67, 69.

Conventionally, outside doors are 1¾ inches thick and the adapter 91 is not employed upon the drill assembly. When the drill assembly is applied to an inside door which is conventionally 1⅜ inches thick, the present adapter 91 is supportably mounted and retained upon the interior surface of the pressure pad 75. The total thickness of the adapter plate 91 and the connected flanges is approximately equal to one-half the difference of the width of the respective inside and outside doors.

The upright housing forming a part of the door lock drill assembly and the means for securing the housing upon the door further include the upright rectangular mount plate 101 upon the interior of arms 23 on which is secured a corresponding cushion pad 99 opposed to cushion pad 75, and of the same construction, and made of a non-metallic material, such as plastic or Teflon or similar material.

A plurality of headed guide support pins 105 movably extend through transverse apertures 107 within the side arms 23, through the mount plate 101 and are secured thereto by a plurality of fasteners 103. These are nested within corresponding apertures formed in the pad 99, FIGS. 3 and 4.

Figure 4:
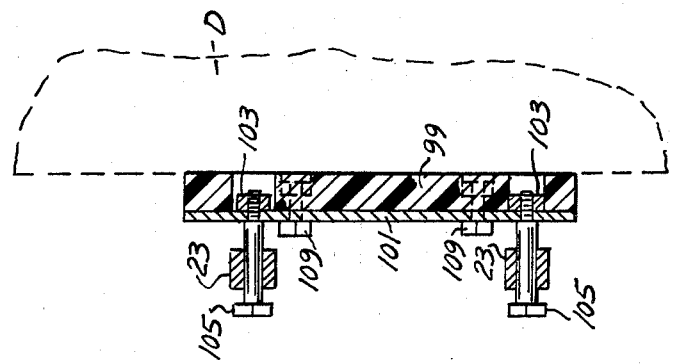
FIG. 4 is a fragmentary section taken in the direction of arrows 4—4 of FIG. 3.

The pad 99 is secured to mount plate 101 by a plurality of fasteners 109, FIGS. 3 and 4, which extend through mount plate 101 and are secured thereto by corresponding nuts nested within recesses formed within pad 99.

A pair of vertically spaced compression screws 111 extend through threaded apertures 113 within the side arms 23 and extend into pressure engagement, as at 115, FIG. 2, with mount plate 101.

With the housing 13 assembled over a door edge and with the respective pads 99 and 75 engaging opposite sides of the door, the housing is compressively secured to the door edge by the tightening of the compression screws 111 which bring the pad 99 into operative compressive engagement with one side of the door and with the corresponding cooperating oppositely directed pressure engagement of the opposing pad 75 against the opposite side of the door.

Formed upon the interior surface of the pad 99 is an annular saw recess 117 which provides a clearance for the saw teeth 69 after the drill tube and saw is moved all the way through the door. This provides a means of completing aperture A shown in FIG. 1, and wherein the saw teeth extend into the clearance annular recess 117 a short distance to avoid splintering of the door surface as the drill passes therethrough.

Also formed within the pad 99 is the central drill center recess 119 adapted to provide a clearance to receive the inner end of the drill center 59, FIG. 2, at the completion of the drilling of the cylindrical aperture through the door.

A similarly formed upright door edge pad 121, FIGS. 1 and 3, of non-metallic material, such as plastic or Teflon, for example, is mounted upon the interior surface of the end wall 17 and is similarly secured thereto by the fasteners 123, which fasteners are nested within the body of pad 121.

Protective sleeve 125 bears at one end against sidewall 15 and is secured thereto as by the welds 41. Said sleeve projects outwardly of end wall 17 and protectively encloses the drill bit 135 when retracted to the position shown in FIG. 3. End plate 17 has a circular aperture 129 therein in registry with the corresponding transverse aperture 131 within the pad 121 in order to receive the drill bit 135 upon the inner end of drill shaft 133.

The construction of the drill shaft 133 is exactly the same as drill shaft 57 shown in FIG. 2, and the guide mechanism for supporting the drill shaft 33 and for effecting reciprocal axial movements of the drill bit 135. The guide rods 29 are of exactly the same as the construction, above described with respect to rods 37, FIGS. 1 and 2.

The drill guide is independently identified as element 127 and corresponds exactly to the construction of the drill guide 43 shown in FIG. 2. Accordingly, its description is not repeated.

In use, a suitable torque tool, such as a power head fragmentarily shown at P in FIGS. 1 and 2, is selectively and alternately applied so that its spindle adapter 137 is adapted to receive and to grippingly engage an outer end portion of either of the drill shafts 57 or 133 for rotatively driving the respective saw 69 or drill bit 135 in longitudinally advancing the saw or drill into portions of the door in the manner shown and for accomplishing the formation in the door of apertures A and B shown in dash lines in FIG. 1.

Having described our invention, reference should now be had to the following claims.

We claim:

1. A door lock drill assembly comprising an upright housing of U-shape in plan, including an apertured side wall and end wall positionable upon the upright edge of a door for drilling a cylindrical first aperture through the door on a first axis and for drilling a second aperture into the door edge on a second axis co-planer to and at right angles to said first axis;

means for securing the housing upon the door engaging opposite sides thereof and the adjacent door edge;

first and second guide means secured upon said side wall and end wall respectively, extending outwardly at right angles thereto;

a hole saw of tubular form slidably and reciprocally mounted upon said first guide means coincident with said first axis movable into said housing for drilling said first aperture through said door;

a drill shaft coaxial and secured to said saw and projecting outwardly of said first guide means;

a drill bit slidably and guidably mounted upon said second guide means coincident with said second axis, alternately movable into said housing for drilling said second aperture into said door and communicating with said first aperture;

and a drill shaft coaxial and secured to said drill bit and projecting outwardly of said second guide means;

said drill shafts adapted to be selectively power driven and fed into said door upon said axes;

said first and second guide means including each a pair of vertically spaced parallel guide rods at their one ends rigidly secured to said side and end walls respectively;

and a drill guide having apertured bosses at its ends and an apertured central hub, said bosses slidably mounted upon a pair of said guide rods, each drill shaft extending through said hubs respectively and secured thereto for guided reciprocal movements upon said first and second axes alternately.

2. In the drill assembly of claim 1, preset stop collars upon the ends of said guide rods limiting retraction of said saw and drill respectively.

3. In the drill assembly of claim 2, additional stop collars upon inner portions of one pair of guide rods limiting inward movement of said hole saw.

4. In the drill assembly of claim 1, the securing of said drill guides upon its respective drill shaft including stop collars secured upon each drill shaft upon opposite sides of each drill guide hub and rotatable with said drill shafts.

5. A door lock drill assembly comprising an upright housing of U-shape in plan, including an apertured side wall and end wall positionable upon the upright edge of a door for drilling a cylindrical first aperture through the door on a first axis and for drilling a second aperture into the door edge on a second axis co-planar to and at right angles to said first axis;

means for securing the housing upon the door engaging opposite sides thereof and the adjacent door edge;

first and second guide means secured upon said side wall and end wall respectively, extending outwardly at right angles thereto;

a hole saw of tubular form slidably and reciprocally mounted upon said first guide means coincident with said first axis movable into said housing for drilling said first aperture through said door;

a drill shaft coaxial and secured to said saw and projecting outwardly of said first guide means;

a drill bit slidably and guidably mounted upon said second guide means coincident with said second axis, alternately movable into said housing for drilling said second aperture into said door and communicating with said first aperture;

and a drill shaft coaxial and secured to said drill bit and projecting outwardly of said second guide means;

said drill shafts adapted to be selectively power driven and fed into said door upon said axes;

said housing securing means including a pair of vertically spaced side arms of L-shape spaced from said side wall and with their ends secured to said end wall;

an upright mount plate spaced from said side wall and side arms;

a plurality of headed bolts slidably mounted upon said side arms and at their ends secured to said mount plate, for selective movement of said mount plate in the direction of said first axis;

and compression screws threaded through said side arms operatively engaging said mount plate for securing and compressively engaging said door within said housing, the adjustability of said mount plate adapting said housing to doors of different widths.

6. In the drill assembly of claim 5, upright rectangular cushion pads of non-metallic material mounted respectively upon the interior of said side wall, end wall and mount plate for cooperative protective engagement with said door.

7. In the drill assembly of claim 6, the pads on said side and end walls being apertured to receive said saw and drill bit, the pad upon said mount plate having an annular clearance recess to receive said saw and to protect the adjacent door side against splintering.

8. In the drill assembly of claim 6, an apertured adapter plate removably mounted upon the cushion pad on said housing side wall;

and means removably securing said adapter plate to said latter pad.

9. In the drill assembly of claim 8, said latter means including adapter slots upon the top and bottom of said cushion pad, and opposed inturned top and bottom flanges upon said adapter plate slidably nested within said pad slots.

10. In the drill assembly of claim 9, said latter means further including an adapter slot upon one side of said pad, and an inturned side flange upon said adapter plate nested within said pad side slot.

11. In the drill assembly of claim 9, an apertured pad of non-metallic material overlying and connected to said adapter plate, said saw adapted for projection through said adapter plate and the pad thereon.

* * * * *